United States Patent
Yang et al.

(10) Patent No.: US 6,797,090 B2
(45) Date of Patent: Sep. 28, 2004

(54) PRODUCTION METHOD OF MULTI-LAYER INFORMATION RECORD CARRIERS

(75) Inventors: Huei-Wen Yang, Chungli (TW);
Wen-Yih Liao, Taichung (TW);
Tzuan-Ren Jeng, Hsinchu (TW);
Chien-Liang Huang, Taoyuan (TW);
Der-Ray Huang, Hsinchu (TW);
Huai-Yu Cheng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 282 days.

(21) Appl. No.: 10/067,757

(22) Filed: Feb. 8, 2002

(65) Prior Publication Data

US 2003/0098119 A1 May 29, 2003

(30) Foreign Application Priority Data

Nov. 27, 2001 (TW) ...................................... 90129239 A

(51) Int. Cl.[7] .............................................. G11B 7/26
(52) U.S. Cl. ...................... 156/74; 156/249; 156/273.5; 156/275.5; 156/275.7; 156/344
(58) Field of Search .......................... 156/74, 247, 249, 156/344, 242, 272.2, 275.5, 275.7, 273.3, 278.5; 369/283, 286; 427/240; 428/64.4, 65.2

(56) References Cited

U.S. PATENT DOCUMENTS

| | | | |
|---|---|---|---|
| 5,059,473 A | 10/1991 | Takahashi et al. | |
| 5,171,392 A | 12/1992 | Iida et al. | |
| 5,708,652 A | 1/1998 | Ohki et al. | |
| 5,874,132 A | 2/1999 | Jung | |
| 6,190,838 B1 * | 2/2001 | Kerfeld | 430/320 |
| 6,465,151 B1 * | 10/2002 | Miwa et al. | 430/270.11 |
| 6,524,418 B2 * | 2/2003 | Yamasaki et al. | 156/230 |
| 6,599,385 B1 * | 7/2003 | Liao et al. | 156/272.2 |

* cited by examiner

Primary Examiner—Jeff H. Aftergut
Assistant Examiner—John T. Haran
(74) Attorney, Agent, or Firm—Birch, Stewart, Kolasch & Birch, LLP

(57) ABSTRACT

A production method of multi-layer information record carriers that involves forming a signal duplication layer on a substrate that contains signals, then replacing a metallic stamping plate with the substrate that comprises the signal duplication layer for manufacturing a signal layer of high molecular materials. After the signal layer has been subjected to curing by exposure to ultra violet light, the signal layer is separated from the signal duplication layer because of the difference between the adhesive forces of the different materials. Multi-layer information record carriers can be manufactured by repeating the manufacturing process. Since the manufacturing process of the invention is simple and speedy, it facilitates the creation of automated facilities for mass production.

12 Claims, 13 Drawing Sheets

PRODUCTION METHOD OF MULTI-LAYER INFORMATION RECORD CARRIERS

FIELD OF THE INVENTION

The invention relates to a production method of multi-layer information record carriers, and more particularly, to a production method of manufacturing multi-layer information record carriers by replacing a substrate that comprises a signal duplication layer with a metallic stamping plate.

BACKGROUND OF THE INVENTION

Along with the advent of the information and multimedia era, there is an increasing need for greater record density and capacity of record carriers by 3C products—computers, communications, and consumer electronics. The record density of the optical information record carrier that uses a red laser as the light source for reading information is relatively restricted because of an optical diffraction limit. So far, certain principles and methods of increasing the record density of optical information record carriers have been introduced. The more important ones for which the technology for the manufacturing processes have recently been developed include: a reduction of the wavelength of the laser light source for reading, such as by replacing the red laser with a blue laser as the light source for reading, or increasing the caliber of a lens. Additionally, improvements may be made in the method of encoding digital signals or using the so-called super-resolution near-field optical structured DVD recording. The record density can be effectively increased by means of the above methods.

Another technology for increasing the record capacity of an information record carrier (such as DVD) involves providing multiple layers for the information record carrier. In other words, the technology creates a 3-D multi-layer record carrier, multiplying its record capacity. The current methods for manufacturing multi-layer information record carriers include the method disclosed in U.S. Pat. No. 5,059,473—injection molding, by which a central substrate is created by injection and signals are formed on both sides of the substrate. A signal duplication layer is then put on both sides of the substrate by means of plating, and eventually a protective plate is affixed to the substrate with transparent glue. Another method is called surface transfer. Given the low adhesive affinity between Polycyclohexylethylene (PECH) and Aluminum, the method of surface transfer involves plating a metallic layer (for example, Aluminum layer) that acts as a total reflection layer on a substrate made from Polycyclohexylethylene by means of high-pressure injection molding. Affixing, with optical glue, the Polycyclohexylethylene substrate to another substrate that is full of signals and is plated with a semi-reflection layer, then the optical glue is subjected to curing through the ultra violet light, and finally when the two substrates are separated from each other. Due to the low adhesive affinity between Polycyclohexylethylene (PECH) and Aluminum, the Aluminum layer is separated from the PECH substrate and then it is affixed to another substrate, becoming a single-side dual-layer DVD. A dual-side dual-layer digital video disc, DVD, is formed when two single-side dual-layer substrates with a thickness of 0.6 mm are affixed to each other through their total reflection layers. Both of the two aforesaid methods may produce a multi-layer information record carrier at a single-side dual-layer level or any higher level. However, both methods employ a high-pressure manufacturing process, thus their defective rates remain high.

In addition, there are some other methods for manufacturing single-side dual-layer record carriers. Firstly, in U.S. Pat. No. 5,171,392, a reflective layer is plated on a substrate for which a signal layer has been cast in advance. It is then affixed to a stamping plate by means of resin. The stamping plate is then detached from the substrate and the second record layer is formed. Finally, the second reflective layer is plated on the substrate and a protective layer is added onto the substrate. Similarly, in U.S. Pat. No. 5,708,652, a reflective layer is also plated on a substrate for which a signal layer has been cast in advance, but a high molecular layer is placed in between the substrate and the stamping plate. The high molecular elements are then melted down at a high temperature and a high pressure and they flow into the grooves of the stamping plate. The melted elements are solidified by ultra violet light. Finally, the stamping plate is detached. The aforesaid methods employ a relatively expensive metallic stamping plate. Take U.S. Pat. No. 5,874,132 as an example. Its manufacturing process primarily involves plating a reflective layer and the first record layer on a substrate beforehand, and pouring high molecular resin while turning a roller-shaped stamping plate. The second record layer is formed provided that their relative speeds are well controlled. As regards this method, attention should be paid to the position of the substrate relative to the stamping plate as well as applying forces to the substrate evenly. Another shortcoming of the method is that it is difficult to produce roller-shaped stamping plates.

In short, all of the above methods require a metallic stamping plate with the exception of surface transfer. However, a PECH stamping plate may not be recycled, making it impossible to cut manufacturing costs. As for the production of multi-layer information record carriers, both surface transfer and injection molding can produce multi-layer information record carriers at a single-side dual-layer lever or higher, though both of them involve a high-pressure manufacturing process, thus their defective rates remain high. U.S. Pat. Nos. 5,171,392, 5,708,652 and 5,874,132 can only produce single-side dual-layer record carriers.

SUMMARY OF THE INVENTION

In view of this, the object of the invention is to use a method, which is suitable for mass production, to manufacture multi-layer information record carriers. The production method for multi-layer information record carriers mentioned in the invention involves forming a signal duplication layer on a substrate that contains signals. The substrate that comprises the signal duplication layer replaces a metallic stamping plate for generating a signal layer, thus the manufacturing cost of multi-layer information record carriers is reduced. In addition, the simple, speedy manufacturing process facilitates the creation of automation facilities for mass production and the enhanced production of good products.

The first method of the invention involves forming a signal duplication layer on a substrate that contains signals, so that it becomes the stamping plate for the signal duplication layer. Then the signal duplication layer is coated with a solution of high molecular resin. Illumination with ultra violet light causes the resin to cure and the signal duplication layer is turned into a signal layer. The signal layer is coated with another layer of high molecular resin solution and is thus turned into a holding layer in order to hold a second substrate that contains signals and comprises a semi-reflection layer. Again, illumination with ultra violet light causes the curing of the holding layer so as to glue the second substrate and the signal layer together. Since the adhesive force between the signal layer and the signal duplication layer of a high molecular material is smaller than that between the signal layer and the holding layer of the second substrate, the signal layer and the signal duplication layer are separated from each other. A total reflection layer is plated on the signal layer so as to form a single-side dual-layer information record carrier. Or, a semi-reflection layer is plated on the signal layer, the single-side dual layer information record carrier is treated as a substrate, and the aforesaid procedure is repeated. Both the signal duplication layer that acts as a stamping plate and the substrate can be recycled repeatedly. The method produces multi-layer information record carriers at a single-side triple-layer level or higher.

The second method of the invention involves forming a signal duplication layer on a substrate that contains signals. A solution of high molecular resin is then smeared and spread over the signal duplication layer, and the signal duplication layer is turned into a signal layer. Directly affix it to the second substrate that contains signals and comprises a semi-reflection layer. Illumination with ultra violet light causes curing of the signal layer. Glue the second substrate and the signal layer together, and detach the signal duplication layer from the signal layer. The signal layer is plated with a total reflection layer so as to create a single-side dual-layer information record carrier. Or, a semi-reflection layer is plated on the signal layer, the single-side dual layer information record carrier is treated as a substrate, the aforesaid procedure is repeated, and multi-layer information record carriers are produced at a single-side triple-layer level or higher. In the second method, a single layer of high molecular solution is used as a signal layer and a holding layer simultaneously. To enable the smooth detachment of the signal duplication layer from the signal layer, different materials are employed to form the signal duplication layer and the semi-reflection layer. Different materials adhere to the signal layer under different degrees of adhesive force. The adhesive force between the signal layer and the signal duplication layer must be smaller than that between the signal duplication layer and semi-reflection layer, in order to allow the signal layer and the signal duplication layer to be separated from each other.

DETAILED DESCRIPTION OF THE PREFERRED EMBODIMENTS

Figure 1A:
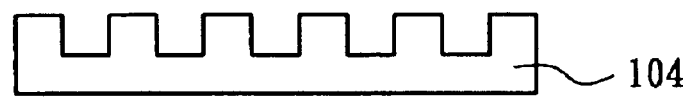
FIGS. 1A–1H show the manufacturing process of the first embodiment of the invention.
Figure 1B:
Figure 1C:
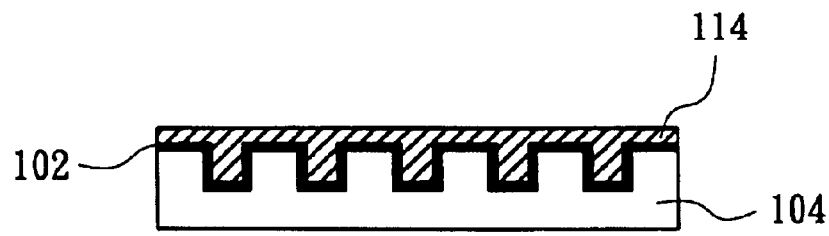
Figure 1D:
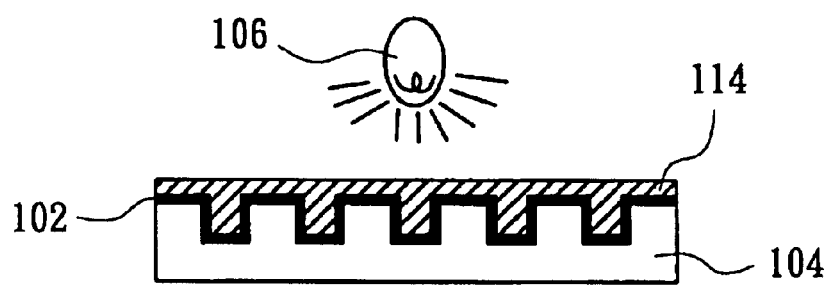
Figure 1E:
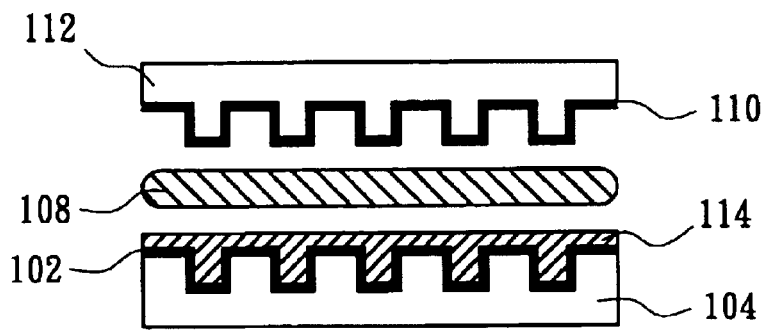
Figure 1F:
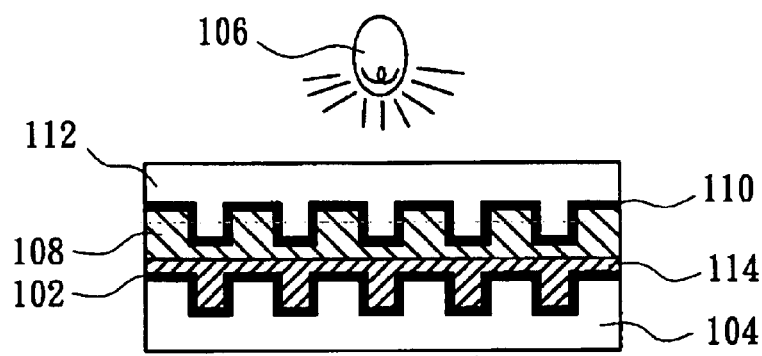
Figure 1G:
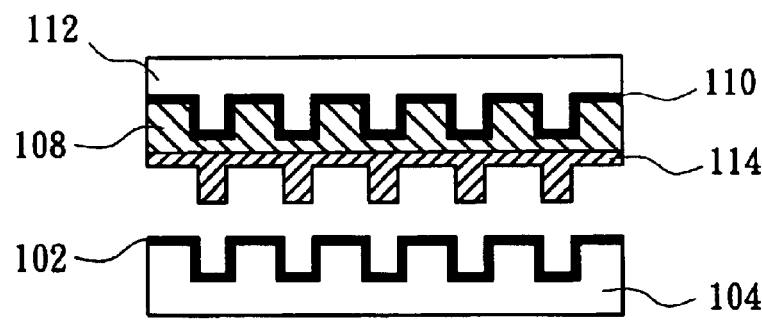
Figure 1H:
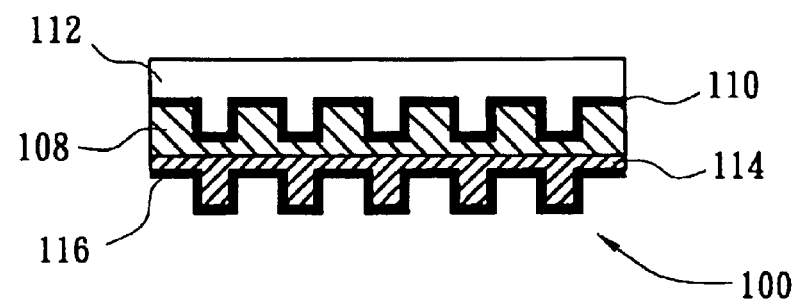
Figure 2A:
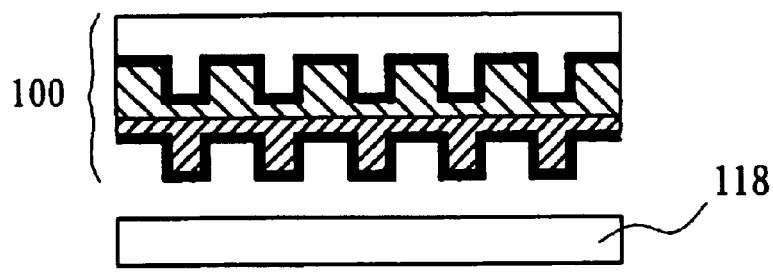
FIGS. 2A–2F depict the manufacturing processes of DVDs of various specifications with reference to the first embodiment of the invention.
Figure 2B:
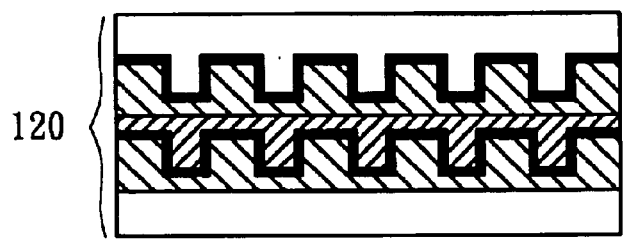
Figure 2C:
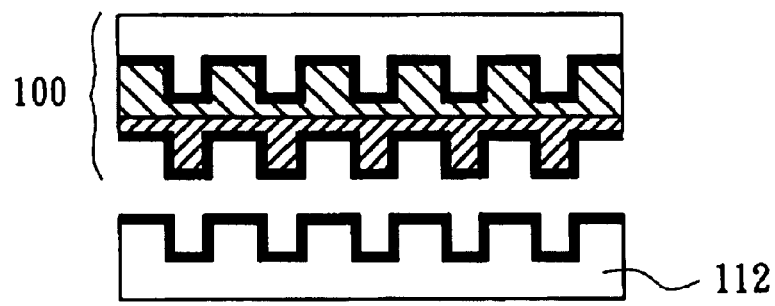
Figure 2D:
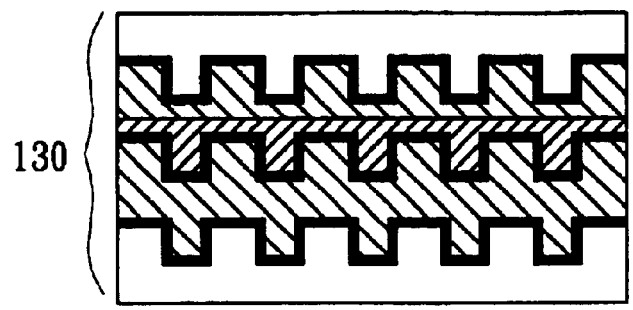

As regards the production method of multi-layer information record carriers of the invention, the manufacturing process of the first embodiment is shown in FIGS. 1A–1H. It includes the following steps: a first substrate 104 (as shown in FIG. 1A) that contains signals is provided. A signal duplication layer with a thickness of 5–60 nm is plated on the first substrate 104 (as shown in FIG. 1B). By means of spin coating, the signal duplication layer 102 is coated with a layer of high molecular resin solution and thus the signal duplication layer 102 is turned into a signal layer 114. The thickness of the signal layer 114 is kept between 40 and 65 $\mu$m (as shown in FIG. 1C). Illumination with ultra violet light 106 causes the curing of the signal layer (as shown in FIG. 1D). The coating of another layer of high molecular resin solution generates a holding layer 108 that is then affixed to a second substrate 112 that contains signals and comprises a reflective layer 110 (as shown in FIG. 1E). Illumination with ultra violet light 106 causes the curing of the holding layer 108 (as shown in FIG. 1F). Since the adhesive force between the signal layer 114 and the signal duplication layer 102 is smaller than that between the signal layer 114 and the holding layer 108, the signal layer 114 is detached from the signal duplication layer 102 (as shown in FIG. 1G). The signal layer 114 is coated with a total reflection layer 116 to form a single-side dual-layer information record carrier 100 (as shown in FIG. 1H). The first embodiment of the invention may be used to produce DVD of various specifications. As shown in FIGS. 2A–2F, which depict the manufacturing processes of DVDs of various specifications by making reference to the first embodiment of the invention, affixing the single-side dual-layer information record carrier 100 to a plastic substrate 118 that does not contain any signal (as shown in FIG. 2A) generates a DVD9 120 (as shown in FIG. 2B). Affixing the single-side dual-layer information record carrier 100 to a plastic substrate 122 that comprises a layer of signals (as shown in FIG. 2C) generates a DVD14 130 (as shown in FIG. 2D).

Figure 2E:
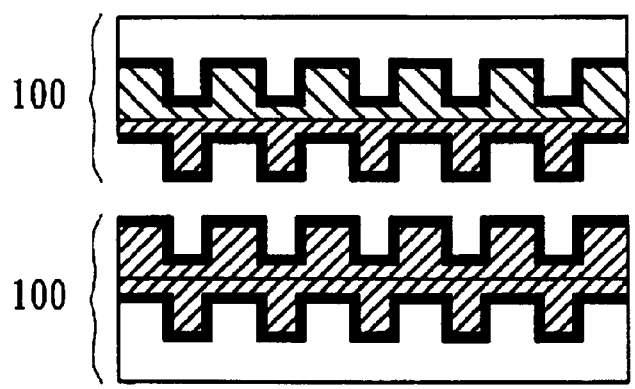
Figure 2F:
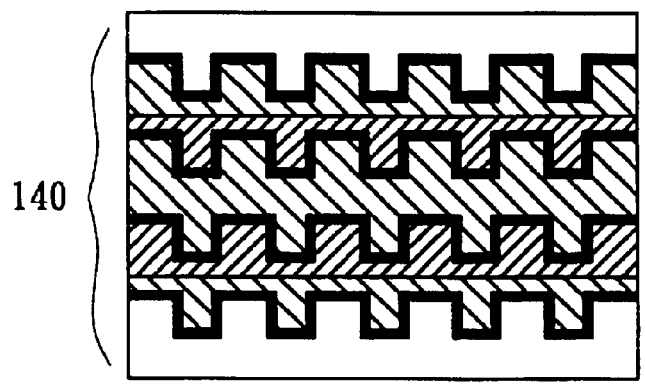

Affixing two single-side dual-layer information record carriers 100 to each other with their total reflection layers touching each other face to face (as shown in FIG. 2E) generates a dual-side dual-layer read-only DVD18 140 (as shown in FIG. 2F).

Figure 3A:
FIGS. 3A–3J show the manufacturing process of the second embodiment of the invention.
Figure 3B:
Figure 3C:
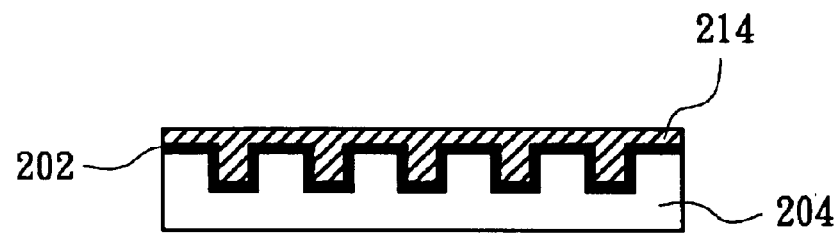
Figure 3D:
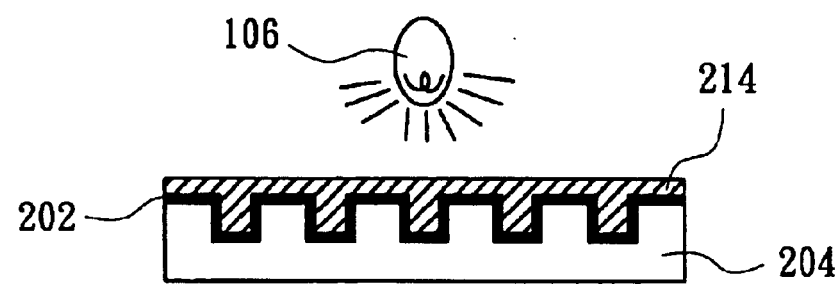
Figure 3E:
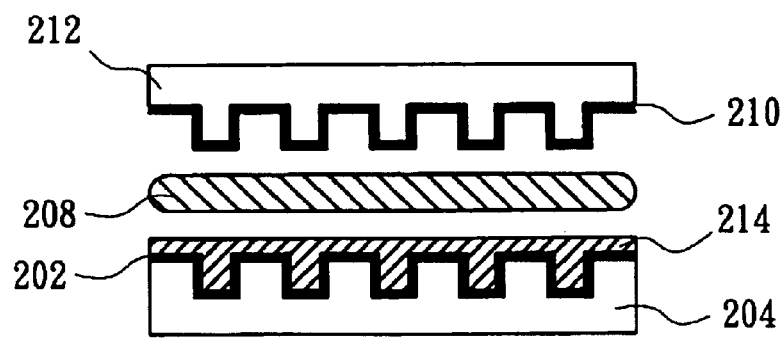
Figure 3F:
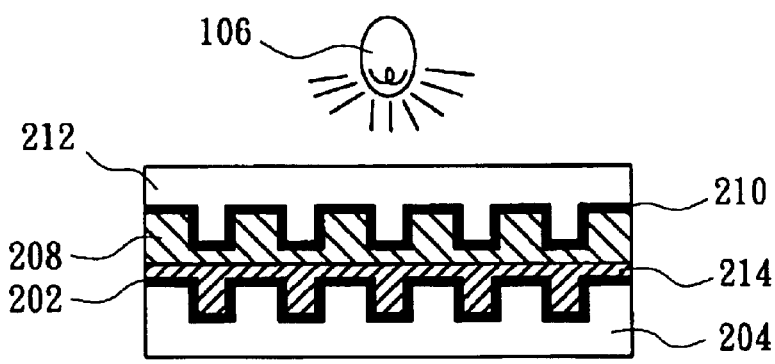
Figure 3G:
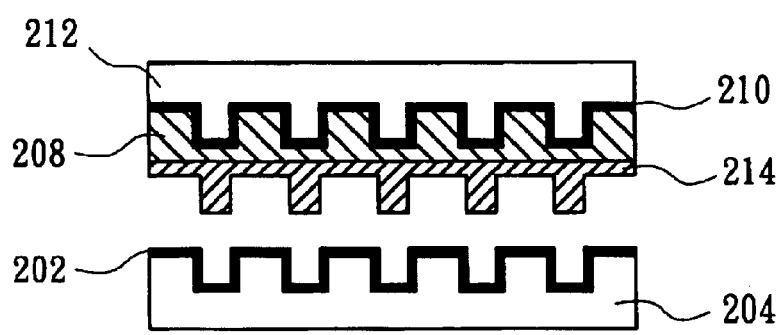
Figure 3H:
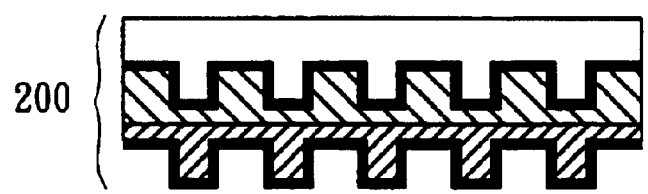
Figure 3I:
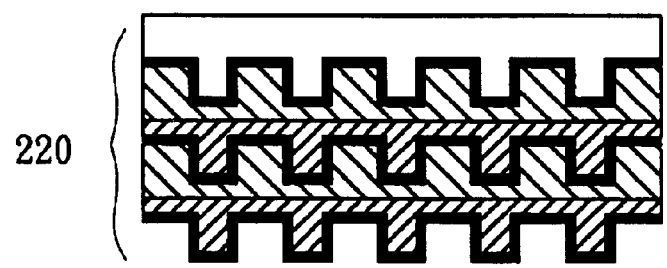
Figure 3J:
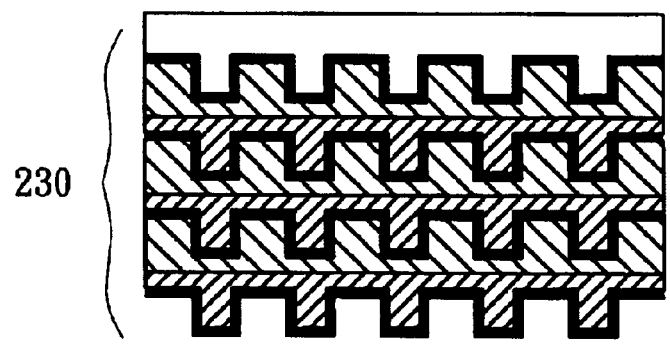

As shown in FIGS. 3A–3J, which depict the manufacturing process of the second embodiment of the invention, a first substrate 204 (as shown in FIG. 3A) is coated with a signal duplication layer 202 with a thickness between 5 and 60 nm (as shown in FIG. 3B). By means of spin coating, the signal duplication layer 202 is coated with a high molecular resin solution that forms a signal layer 214 (as shown in FIG. 3C). The thickness of the signal layer 214 is kept between 40 and 65 $\mu$m. Illumination with ultra violet light 106 causes the curing of the signal layer 214 (as shown in FIG. 3D). The coating of another layer of high molecular resin solution generates a holding layer 208. The holding layer 208 is affixed to a second substrate 212 that contains signals and is plated with a reflective layer 210 (as shown in FIG. 3E). Illumination with ultra violet light causes the curing of the holding layer 208 (as shown in FIG. 3F). Since the adhesive force between the signal layer 214 and the signal duplication layer 202 is smaller than that between the signal layer 214 and the holding layer 208, the signal layer 214 is detached from the signal duplication layer 202 (as shown in FIG. 3G), forming a single-side dual-layer information record carrier 200 (as shown in FIG. 3H). Treat the single-side dual-layer information record carrier as the second substrate, coat the second substrate with a semi-reflection layer, repeat the steps of the second embodiment, and form a single-side triple-layer information record carrier 220 (as shown in FIG. 3I). Similarly, with the same method, it is possible to produce a single-side quadri-layer information record carrier 230 (as shown in FIG. 3J) as well as a multi-layer information record carrier with more than four layers.

Figure 4A:
FIGS. 4A–4F show the manufacturing process of the third embodiment of the invention.
Figure 4B:
Figure 4C:
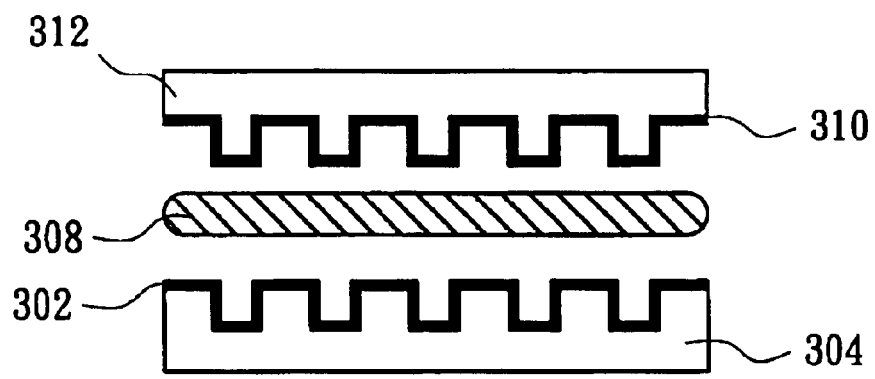
Figure 4D:
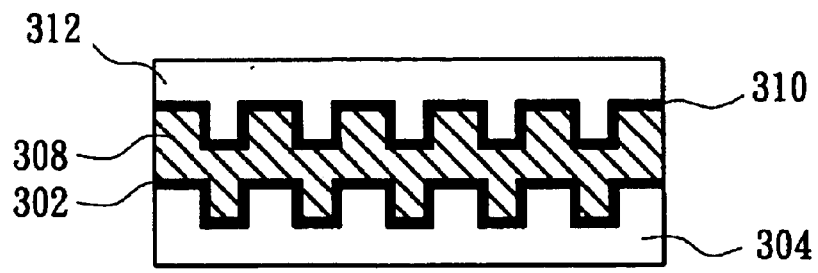
Figure 4E:
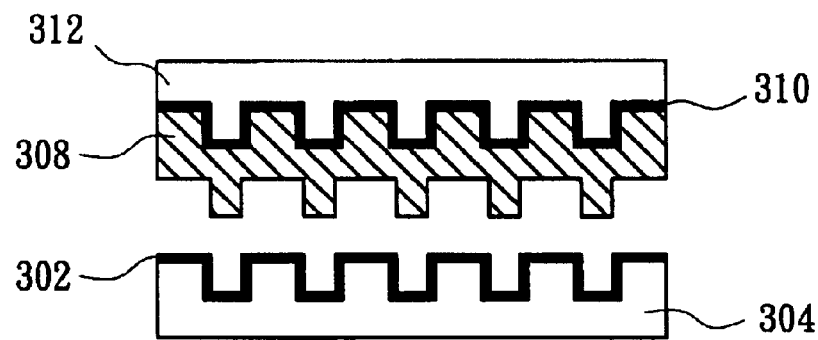
Figure 4F:
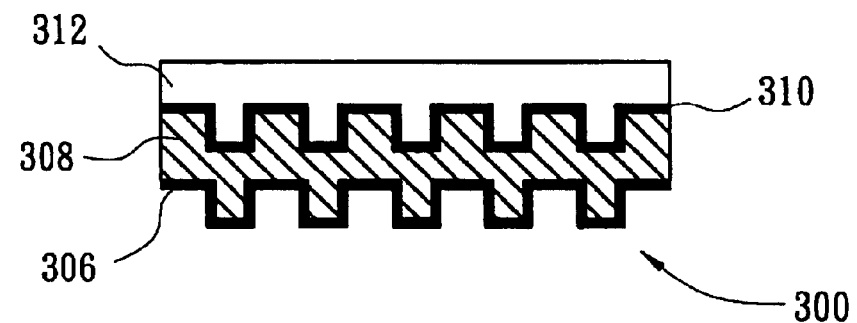

As shown in FIGS. 4A–4F, which depict the manufacturing process of the third embodiment of the invention, a first substrate 304 (as shown in FIG. 4A) that contains signals is coated with a signal duplication layer 302 with a thickness between 5 and 60 nm (as shown in FIG. 4B). By means of spin coating, the signal duplication layer 302 is coated with high molecular resin solution and forms a signal layer 308. Then, it is affixed to a second substrate 312 that contains signals and comprises a reflective layer 310 (as shown in FIG. 4C). Illumination with ultra violet light causes the curing of the signal layer 308, and it is then affixed to the second substrate 312 (as shown in FIG. 4D). Since the adhesive force between the signal layer 308 and the signal duplication layer 302 is smaller than that between the signal layer 308 and the reflective layer 310 of the second substrate 312, the signal layer 308 is detached from the signal duplication layer 302 (as shown in FIG. 4E), forming a single-side dual-layer information record carrier 300 (as shown in FIG. 4F) after plating the signal layer 308 with a total reflection layer 306.

Figure 5A:
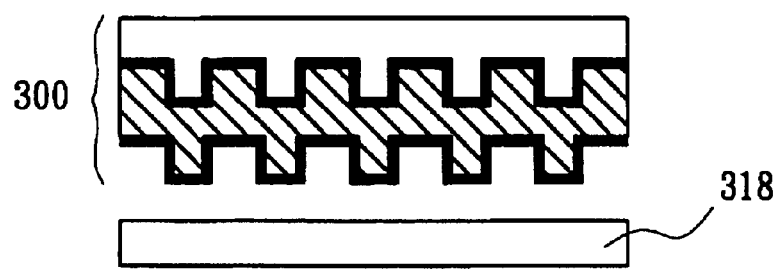
FIGS. 5A–5F depict the manufacturing processes of DVDs of various specifications with reference to the third embodiment of the invention.
Figure 5B:
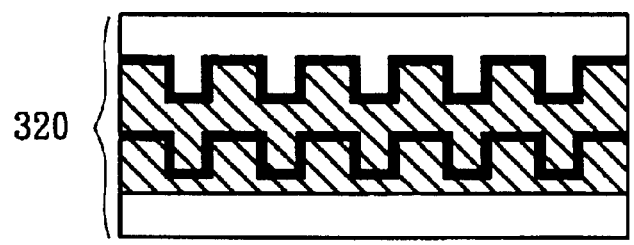
Figure 5C:
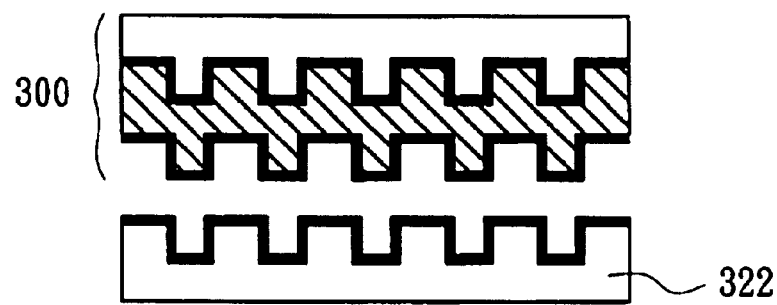
Figure 5D:
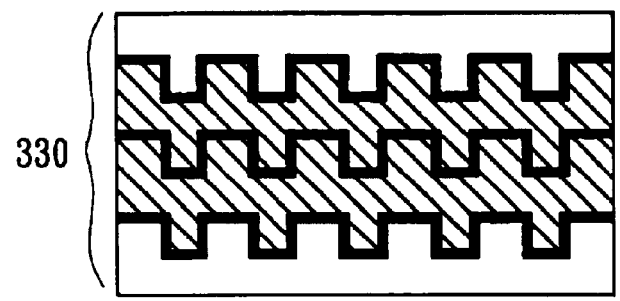
Figure 5E:
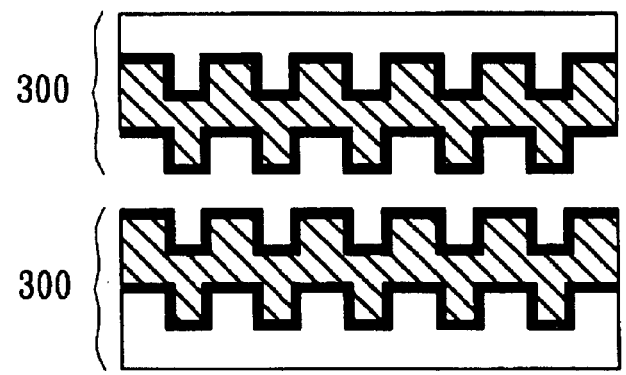
Figure 5F:
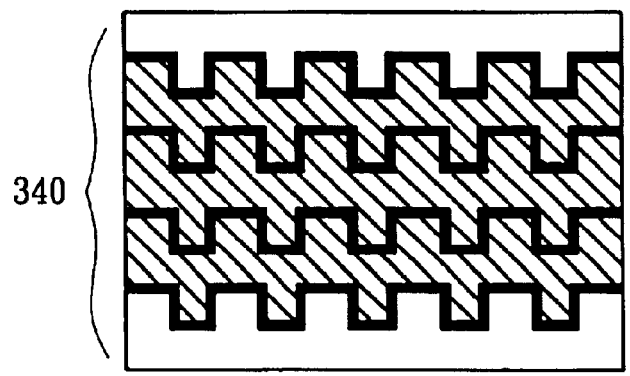

As shown in FIGS. 5A–5F, which depict the manufacturing processes of DVDs with different specifications described in the third embodiment of the invention, affixing the single-side dual-layer information record carrier 300 to a plastic substrate 318 that does not contain any signal (as shown in FIG. 5A) generates a DVD9 320 (as shown in FIG. 5B). Affixing the single-side dual-layer information record carrier 300 to a plastic substrate 322 that comprises a layer of signals (as shown in FIG. 5C) generates a DVD14 330. Affixing two single-side dual-layer information record carriers 300 to each other with their total reflection layers touching each other face to face (as shown in FIG. 5E) generates a dual-side dual-layer read-only DVD18 340 (as shown in FIG. 5F).

Figure 6A:
FIGS. 6A–6H show the manufacturing process of the fourth embodiment of the invention.
Figure 6B:
Figure 6C:
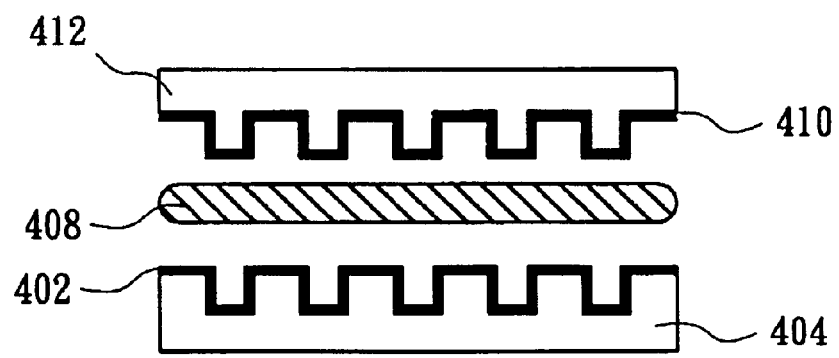
Figure 6D:
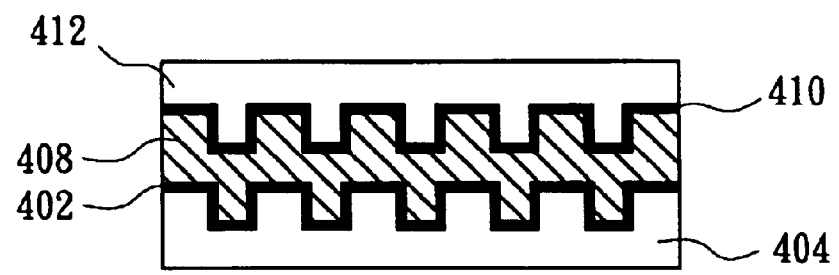
Figure 6E:
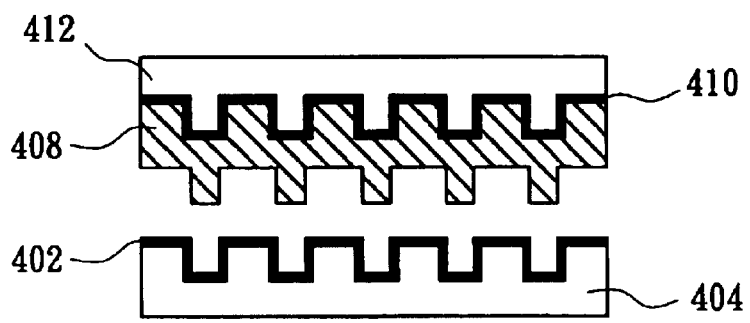
Figure 6F:
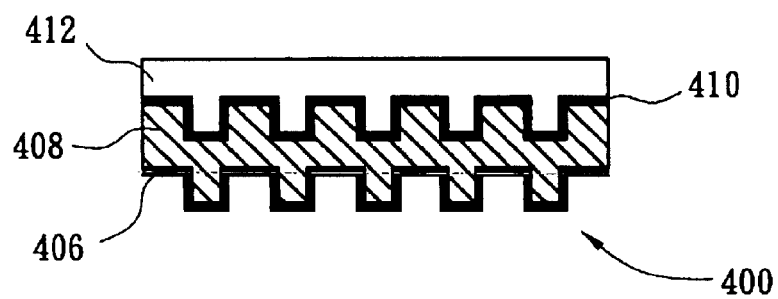
Figure 6G:
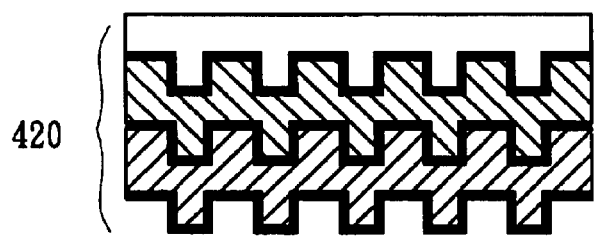
Figure 6H:
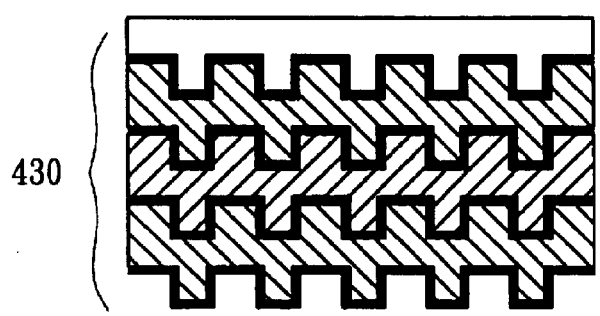

As shown in FIGS. 6A–6H, which depict the manufacturing process of the fourth embodiment of the invention, a first substrate 404 (as shown in FIG. 6A) that contains signals is coated with a signal duplication layer 402 with a thickness between 5 and 60 nm (as shown in FIG. 6B). By means of spin coating, the signal duplication layer 402 is coated with high molecular resin solution that forms a signal layer 408. Then, it is affixed to a second substrate 412 that contains signals and comprises a reflective layer 410 (as shown in FIG. 6C). Illumination with ultra violet light causes the curing of the signal layer 408. It is then affixed to the second substrate 412 (as shown in FIG. 6D). Since the adhesive force between the signal layer 408 and the signal duplication layer 402 is smaller than that between the signal layer 408 and the reflective layer 410 of the second substrate 412, the signal layer 408 is detached from the signal duplication layer 402 (as shown in FIG. 6E), forming a single-side dual-layer information record carrier 400 (as shown in FIG. 6F) after plating the signal layer 408 with a total reflection layer 406. Treat the single-side dual-layer information record carrier 400 as the second substrate, repeat the steps of the third embodiment, and form a single-side triple-layer information record carrier 420 (as shown in FIG. 6G). Similarly, by repeating the steps of the third embodiment, it is possible to produce a single-side quadri-layer information record carrier 430 (as shown in FIG. 6H) as well as a multi-layer information record carrier with more than four layers.

As regards the production method of multi-layer information record carriers disclosed in the invention, the materials of the first and second substrate chosen for the first, second, third and fourth embodiments are as follows: Polycarbonate, PMMA or glass (select any option as appropriate). There are three options for producing the high molecular resin solution for the record layer, namely Epoxy, acrylic or Polyester (choose one of them). Choose one of the following for plating a signal duplication layer on the substrate that contains signals: gold, silver, aluminum, chromium, platinum, nickel, silicon or their alloys. Choose one of the following for the semi-reflection layer placed in between the signal layer and the signal duplication layer: gold, silver, aluminum, silicon or their alloys. Choose one of the following for producing the total reflection layer: gold, silver, aluminum, chromium, copper, silicon or their alloys.

As regards the production method of multi-layer information record carriers disclosed in the invention, the thickness of the record layers in the first, second, third and fourth embodiments is controlled by the speed of spin coating and the concentration of the high molecular resin solution. Coats have different thickness to meet the different requirements of the specifications of the DVDs. In the embodiments, the first substrate and the second substrate are 1.2 mm and 0.6 mm respectively, and corresponding to different wavelengths of the laser, their thickness can be one of the following: 1.1 mm, 0.5 mm and 0.3 mm. After being detached from a signal layer, the first substrate that is used to copy a signal layer can be recycled up to 30 times in copying the next signal layer, requiring no special treatment. The high molecular resin solution for producing the record layer is made from photopolymer. The record layer is subjected to rapid curing by exposure to ultra violet light, requiring no air drying of the solvent of the high molecular resin solution of the record layer or drying the record layer by heat. The manufacturing process is thus streamlined and a lot of manufacturing time is saved.

What is claimed is:

1. A production method of multi-layer information record carriers comprising:
   providing a first substrate and a second substrate;
   forming a signal duplication layer that contains signals on said first substrate;
   spin coating a high molecular resin solution on the signal duplication layer to form a signal layer;
   curing the signal layer;
   coating the surface of the cured signal layer with a second high molecular resin solution;
   affixing said second substrate to the second high molecular resin solution so as to glue the signal layer and said second substrate together;
   curing the second high molecular resin solution; and
   separating said signal layer from said signal duplication layer of said second substrate.

2. The production method of multi-layer information record carriers of claim 1, wherein the first substrate and the second substrate are made from a material selected from one of the following: Polycarbonate (PC), PMMA and glass.

3. The production method of multi-layer information record carriers of claim 1, wherein the signal duplication layer is made from one of the following: gold, silver, aluminum, chromium, platinum, nickel, silicon and their alloys.

4. The production method of multi-layer information record carriers of claim 3, wherein the signal duplication layer is formed by plating and its thickness is controlled.

5. The production method of multi-layer information record carriers of claim 1, wherein the high molecular resin solution and the said second high molecular resin solution are made from a material chosen from one of the following: Epoxy, Acrylics or Polyester.

6. The production method of multi-layer information record carriers of claim 1, wherein the high molecular resin solution and the second high molecular resin solution are subjected to curing by the illumination of ultra violet light.

7. The production method of multi-layer information record carriers of claim 1, wherein the thickness of the high molecular resin solution and the second high molecular resin solution is controlled by the speed of spin coating and the concentrations of the high molecular resin solution and the second high molecular resin solution.

8. The production method of multi-layer information record carriers of claim 1, wherein the second substrate is repeatedly affixed to signal layers so as to form multi-layer information record carriers.

9. The production method of multi-layer information record carriers of claim 8, further comprising a semi-reflection layer placed in between the signal layers of said multi-layer information record carriers.

10. The production method of multi-layer information record carriers of claim 9, wherein the semi-reflection layer is made from a material selected from one of the group consisting of gold, silver, aluminum, silicon and their alloys.

11. The production method of multi-layer information record carriers of claim 1, further comprising a total reflection layer placed on the signal layer.

12. The production method of multi-layer information record carriers of claim 11, wherein the total reflection layer is made from a metal and alloys selected from one of the group consisting of gold, silver, aluminum, copper, chromium and silicon.

* * * * *